United States Patent Office 3,317,523
Patented May 2, 1967

---

3,317,523
4-SUBSTITUTED-1,2,3-BENZOXATHIAZINE 2,2 DIOXIDES
John B. Wright, Kalamazoo Township, Kalamazoo County, Mich., assignor to The Upjohn Company, Kalamazoo, Mich., a corporation of Delaware.
No Drawing. Filed Mar. 29, 1965, Ser. No. 443,646
12 Claims. (Cl. 260—243)

This invention pertains to novel organic compounds and to a novel chemical process for preparing the same. The invention pertains more particularly to novel 4-substituted-1,2,3-benzoxathiazine 2,2-dioxides, and to the novel process—reacting sulfamide with a 2-hydroxybenzophenone or a 2'-hydroxyalkano-phenone to produce the 4-substituted-1,2,3-benzoxathiazine 2,2-dioxide.

The novel 4-substituted-1,2,3-benzoxathiazine 2,2-dioxides of this invention can be represented by the structural formula:

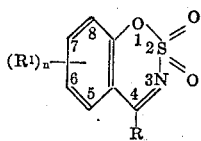

I wherein R is a member selected from the group consisting of lower-alkyl, phenyl, and substituted phenyl; $R^1$ is a member selected from the group consisting of halogen, lower-alkyl, and lower-alkoxy; and $n$ is a whole number from 0 to 2, inclusive.

The term "lower-alkyl," as used herein, includes methyl, ethyl, propyl, isopropyl, butyl, isobutyl, sec-butyl, and tert-butyl. Likewise, the term "lower-alkoxy" includes methoxy, ethoxy, propoxy, isopropoxy, butoxy, isobutoxy, sec-butoxy, and tert-butoxy. The term "halogen" includes bromine, chlorine, fluorine, and iodine. The term "substituted phenyl," as used herein, includes lower-alkyl substituted phenyl; lower-alkoxy substituted phenyl; and halogen substituted phenyl.

In accordance with this invention, the novel 4-substituted-1,2,3-benzoxathiazine 2,2-dioxides (compounds of Formula I, above) are useful as intermediates. Illustratively, the compounds according to Formula I can be reduced to form 3,4-dihydro-4-substituted-1,2,3-benzoxathiazine 2,2-dioxides of the formula:

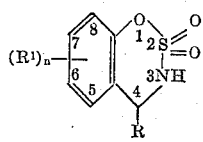

I wherein R, $R^1$, and $n$ are as defined above. The compounds of Formula II can be reacted with chlorine to produce active-chlorine compounds in which the N-attached hydrogen atom is replaced by a chlorine atom. The thus-produced active-chlorine compounds are useful as disinfectants, bleaching agents, and antiseptics. Illustratively, they can be used to kill microorganisms in water and to bleach textiles such as cotton fabrics.

The process of the invention comprises, and the novel compounds of Formula I are prepared by condensing sulfamide,

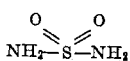

with a 2-hydroxybenzophenone or a 2'-hydroxyalkanophenone of the formula:

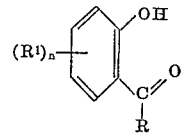

III wherein R, $R^1$, and $n$ are as defined above. In accordance with a preferred embodiment of the process of this invention, the condensation reaction is effected in a melt of the two reactants, at a temperature in the range of about 110° C. to about 225° C., preferably about 120° C. to about 180° C. The condensation can be effected, if desired, in a mutual solvent for sulfamide and a selected hydroxy ketone of Formula III. Suitable solvents include propylene glycol, a mixture of biphenyl and diphenyl ether, and mineral oil. In general, an excess of sulfamide is used in the reaction mixture; preferably, from about 1.5 moles to about 10 moles of sulfamide is used for each mole of 2-hydroxyphenyl ketone.

When the reactants are melted together and reacted without a solvent, the product can be recovered by treating the reaction mixture with a mixture of inert organic solvent and water, and separating the organic layer in which the product is soluble. Suitable inert organic solvents include methylene chloride (preferred), chloroform, benzene, toluene, and the like. The product can be purified by evaporating the solvent and recrystallizing from solvents such as ethyl acetate, isopropyl alcohol, ethanol, cyclohexane, and the like.

Reduction of a 4-substituted-1,2,3-benzoxathiazine 2,2-dioxide (compound according to Formula I) to produce a 3,4-dihydro-4-substituted-1,2,3-benzoxathiazine 2,2-dioxide (compound according to Formula II) is conveniently accomplished by any of the well-known methods for reducing a carbon:nitrogen double bond. Illustratively, a 4-substituted-1,2,3-benzoxathiazine 2,2-dioxide can be readily reduced with hydrogen in the presence of a hydrogenation catalyst and an inert organic solvent such as dioxane or an alkanol, for example, methanol, ethanol, propyl alcohol, and the like. Thus, catalytic hydrogenation can be employed in the presence of a noble metal catalyst such as platinum, palladium (advantageously supported on charcoal, calcium carbonate, or other conventional supports), and the like; or a base metal catalyst, such as Raney nickel, Raney cobalt, and the like; and in the presence of an inert solvent as illustrated above. Pressures ranging from about atmospheric pressure to about 75 p.s.i. and temperature conditions ranging from about 10° C. to about 50° C. can be employed in conducting the hydrogenation; pressures of about 40 to about 50 p.s.i. and reaction temperatures of about 20° C. to about 30° C. ordinarily being preferred. Alternatively, chemical reducing agents can be employed, e.g., sodium borohydride, ammonium sulfide, ferrous sulfate in alkaline solution (Clemo et al., J. Chem. Soc. 1924, p. 1770), or stannous chloride (McCombie et al., J. Chem. Soc. 1928, p. 358), or electrolytic reduction can be employed, e.g., in the presence of a mixture of dioxane and dilute hydrochloric acid. Catalytic hydrogenation is preferred, particularly catalytic hydrogenation in the presence of a noble metal catalyst such as platinum. The 3,4-dihydro-4-substituted-1,2,3-benzoxathiazine 2,2-dioxide is separated from the reaction mixture and recovered in pure form by conventional procedures such as filtration, solvent evaporation, solvent extraction, distillation, and crystallization.

The following examples are illustrative of the process and products of the present invention but are not to be construed as limiting.

Example 1.—Preparation of 4-methyl-1,2,3-benzoxathiazine 2,2-dioxide

A mixture consisting of 13.17 gm. (0.1 mole) of 2'-hydroxyacetophenone and 24 gm. (0.25 mole) of sulfamide was heated with stirring in an oil bath at 130° C. for 1 hr. After adding another 24 gm. of sulfamide, heating and stirring were continued at 130° C. for ½ hr. and then the mixture was slowly heated to 180° C. Heating at 180° C. was continued for 3 hrs. with stirring. The reaction mixture was cooled and diluted with a mixture consisting of 150 ml. of water and 154 ml. of methylene chloride. The methylene chloride layer was separated and the solvent was removed by evaporation. There was thus obtained 8.25 gm. (42% yield) of a solid melting at 114° to 118° C. Recrystallization from ethanol gave 4-methyl-1,2,3-benzoxathiazine 2,2-dioxide as tan prisms melting at 119° to 121° C.

*Analysis.*—Calcd. for $C_8H_7NO_3S$: C, 48.73; H, 3.58; N, 7.10; S, 16.26. Found: C, 48.88; H, 3.62; N, 7.13; S, 15.94.

Example 2.—Preparation of 4,6-dimethyl-1,2,3-benzoxathiazine 2,2-dioxide

A mixture consisting of 15 gm. (0.1 mole) of 2'-hydroxy-5'-methylacetophenone and 24 gm. (0.25 mole) of sulfamide was heated with stirring at 120° to 130° C. for 1 hr. After adding another 24 gm. of sulfamide, heating and stirring were continued at 120° to 130° C. for ½ hr. The reaction mixture was then heated to 170° to 180° C. for 3 hrs., and then cooled. The glassy solid was dispersed in a mixture of water and methylene chloride. The methylene chloride layer was separated, and the solvent was removed by evaporation under reduced pressure. The oily substance thus obtained solidified on standing and was recrystallized 2 times from 95% ethanol to give tan prisms that melted at 125° to 126° C. A third recrystallization from 95% ethanol gave 4,6-dimethyl-1,2,3-benzoxathiazine 2,2-dioxide as tan prisms melting at 127° to 128° C.

*Analysis.*—Calcd. for $C_9H_9NO_3S$: C, 51.18; H, 4.29; N, 6.63; S, 15.18. Found: C, 51.46; H, 4.32; N, 6.70; S, 15.34.

Example 3.—Preparation of 4-phenyl-1,2,3-benzoxathiazine 2,2-dioxide

A mixture consisting of 19.8 gm. (0.1 mole) of 2-hydroxybenzophenone and 24 gm. (0.25 mole) of sulfamide was heated with stirring at 130° C. for ½ hr. After adding another 24 gm. of sulfamide, heating and stirring at 130° C. were continued for another ½ hr. The reaction mixture was then heated to 180° C. for 3 hrs., allowed to cool, and then diluted with a mixture of water and methylene chloride. The methylene chloride layer was separated, dried over anhydrous magnesium sulfate, and the methylene chloride was removed by evaporation under reduced pressure. The oil thus obtained was mixed with cyclohexane and the solution was set aside. The yellow prism-like crystals that formed amounted to 3.1 gm. and had a melting point of 90° to 94° C. After recrystallizing two times from 95% ethanol, the 4-phenyl-1,2,3-benzoxathiazine 2,2-dioxide as colorless prisms had a melting point of 115° to 116° C.

*Analysis.*—Calcd. for $C_{13}H_9NO_3S$: C, 60.22; H, 3.50; N, 5.40; S, 12.37. Found: C, 60.33; H, 3.32; N, 5.42; S, 12.86.

Example 4.—Preparation of 7-methoxy-4-phenyl-1,2,3-benzoxathiazine 2,2-dioxide Following the procedure of Example 1 but substituting 2-hydroxy-4-methoxybenzophenone for 2'-hydroxyacetophenone, there was obtained after recrystallization of the crude product from isopropyl alcohol, 8.61 gm. (30% yield) of 7-methoxy-4-phenyl-1,2,3-benzoxathiazine 2,2-dioxide as light yellow prisms melting at 148.5° to 150° C.

*Analysis.*—Calcd. for $C_{14}H_{11}NO_4S$: C, 58.12; H, 3.84; N, 4.84; S, 11.08. Found: C, 58.51; H, 3.66; N, 4.82; S, 11.37.

Example 5.—Preparation of 6-chloro-4-phenyl-1,2,3-benzoxathiazine 2,2-dioxide A mixture consisting of 23.35 gm. (0.1 mole) of 5-chloro-2-hydroxybenzophenone and 48 gm. (0.5 mole) of sulfamide was heated with stirring at 130° C. for ½ hr. After adding an additional 48 gm. of sulfamide, heating and stirring were continued at 130° C. for another ½ hr. The reaction mixture was then heated to 180° C. for 20 hrs., cooled to about 25° C., and diluted with a mixture of methylene chloride and water. The methylene chloride layer was separated, dried over anhydrous magnesium sulfate, and the solvent was removed by evaporation under reduced pressure. The oily solid thus obtained was recrystallized 2 times from cyclohexane and once from 95% ethanol to give the product as yellow prisms melting at 152° to 154.5° C. After another recrystallization from 95% ethanol, 6-chloro-4-phenyl-1,2,3-benzoxathiazine 2,2-dioxide was obtained as yellow tinted prisms melting at 155° to 156.5° C.

*Analysis.*—Calcd. for $C_{13}H_8ClNO_3S$: C, 53.16; H, 2.74; Cl, 12.07; N, 4.77; S, 10.92. Found: C, 53.05; H, 2.63; Cl, 11.93; N, 4.78; S, 10.64.

Example 6

Following the procedure of Example 1 but substituting 2' - bromo - 2 - hydroxybenzophenone, 5 - bromo-, 3,5-dibromo-, 3'-bromo- 5-tert-butyl-, 4'chloro-, 2'5-dichloro-, 2'-chloro-5-fluoro-, 4'-chloro-3-methyl-, 2',5-dichloro-4-methyl-, 2'-chloro-4-methoxy-, 5 - fluoro-, 5 - fluoro-4'-methoxy-, 6-methyl-, 2',4',-dimethyl-, 2',4',6'-trimethyl-, 3,4,6-trimethyl-, 2',3',5',6'-tetramethyl-, 3-ethyl-, 2'-ethyl-4,4',5,5' - tetramethoxy-, 5-isopropyl-4-methyl-, 4'-butyl-4 - methoxy-, 5 - tert-butyl-, 4-tert-butyl-2',3',5',6'-tetramethyl-, 4'-tert-butyl-4-methoxy-, 2',4'-dimethoxy-, 4,4'-dimethoxy-, 2',4,5',6-tetramethoxy-, 4-methoxy-4'-methyl-, 4-methoxy-3'-propoxy-, 4,4',5,5'-tetramethoxy-2'-propyl-, 4-ethoxy-, 4,4'-diethoxy-, 4-propoxy-, 4-butoxy-, 4-butoxy-2',4'-dimethoxy-, 4 - isobutoxy - 2',4' - dimethoxybenzophenone; 5'-bromo-3'-chloro-2'-hydroxyacetophenone, 3'-bromo-4'-methyl-, 3'-bromo-5'-tert-butyl-, 3'-bromo-4',5',6'-trimethoxy-, 4',5'-dichloro-, 3'-chloro-5'-isopropyl-6'-methyl-, 4'-fluoro-, 4'-iodo-, 3',5'-dimethyl-, 4'-ethyl-, 4'-propyl-, 3' - isopropyl-, 5'-isopropyl-3',4'-dimethyl-, 4'-butyl-, 3'sec-butyl-, 3',4',5'-trimethoxy-, 4'-ethoxy-, 3',4'-diethoxy-, 4'-propoxy-, 4'-butoxy-2' - hydroxyacetophenone; 3' - bromo-5'-fluoro-2'-hydroxy-propiophenone, 5'-chloro-4'-methyl-, 5'-ethyl-, 3'-isopropyl-6'-methyl-, 6'-isopropyl-3'-methyl-, 3',5'-dipropyl-, 5'-tert-butyl-, 3'-tert-butyl-6'-methyl-, 4',5',6'-trimethoxy-, 5'-ethoxy-2'-hydroxypropiophenone; 3'-bromo-5'-tert-butyl-2'-hydroxybutyrophenone, 5' - chloro - 4',6' - dimethyl-, 3'-isopropyl-6'-methyl-, 4'-methoxy-2'-hydroxybutyrophenone; 2,3' - dimethyl-2'-hydroxypropiophenone; 3',5' - dichloro-2'-hydroxyvalerophenone, 5'-fluoro-, 4'-methyl-, 4'-propyl-, 3'-isopropyl-6'-methyl-, 5' - methoxy-2'-hydroxyvalerophenone; 4',6' - dimethoxy - 2'-hydroxy-3-methylbutyrophenone, and 2'-hydroxy-3,4'-dimethylbutyrophenone for 2'-hydroxyacetophenone, there were prepared 4-(2-bromophenyl)-1,2,3-benzoxathiazine 2,2 - dioxide, 6-bromo-4-phenyl-1,2,3-benzoxathiazine 2,2-dioxide, 6,8 - dibromo-, 4-(3-bromophenyl)-6-tert-butyl-1,2,3 - benzoxathiazine 2,2-dioxide, 4-(4-chlorophenyl)-1,2,3-benzoxathiazine 2,2-dioxide, 6-chloro-4-(2-chlorophenyl)-1,2,3-benzoxathiazine 2,2-dioxide, 6-fluoro-4-(2-chlorophenyl)-1,2,3-benzoxathiazine, 2,2-dioxide, 8-methyl-4-(4-chlorophenyl)1,2,3 - benzoxathiazine 2,2-dioxide, 6-chloro-7-methyl-4-(2-chloro-phenyl)-1,2,3 - benzoxathiazine 2,2 - dioxide, 7-methoxy-4-(2-chlorophenyl)-1,2,3-benzoxathiazine 2,2-dioxide, 6-fluoro-4-phenyl-1,2,3-benzoxathiazine 2,2-dioxide, 6-fluoro-4-(4-methoxy-phenyl)-, 5-methyl-4-phenyl-1,2,3-benzoxathiazine 2,2-dioxide, 4-(2,4-dimethylphenyl)-, 4-(2,4,6-trimethylphenyl)-, 4-phenyl-5,7,8-trimethyl-, 4-(2,3,5,6 - tetramethylphenyl)-, 8 - ethyl-4-phenyl-, 6,7,-dimethoxy-4-(2-ethyl-4,5-dimethoxyphenyl)-, 6-isopropyl-7-methyl - 4 - phenyl-, 7-methoxy-4-(4-butylphenyl)-, 4-phenyl--6-tert-butyl-, 4 - (2,3,5,6 - tetramethylphenyl)-7-tert-butyl-, 7-methoxy-4-(4-tert-butylphenyl)-, 4-(2,4,-dimethoxy-phenyl)-, 7-methoxy-4-(4-methoxyphenyl)-, 5,7-dimethoxy-4-(2,5-dimethoxyphenyl)-, 7 - methoxy-4-(4-methylphenyl)-, 7 - methoxy-4-(3-propoxyphenyl)-, 6,7-dimethoxy-4-(4,5-dimethoxy-2-propyl-phenyl)-, 7-ethoxy-4-phenyl-, 7-ethoxy-4-(4-ethoxyphenyl)-, 7 - propoxy-4-phenyl-, 7-butoxy-4-phenyl-, 7-butoxy-4-(2,4-dimethoxy-phenyl)-, 7 - isobutoxy - 4-(2,4-dimethoxyphenyl)-1,2,3-benzoxathiazine 2,2-dioxide; 6-bromo-8-chloro-4-methyl-1,2,3-benzoxathiazine 2,2-dioxide, 8-bromo-4,7-dimethyl-, 8-bromo-6-tert-butyl-4-methyl-, 8-bromo-5,6,7-trimethoxy-4-methyl-, 6,7-dichloro-4-methyl-, 8-chloro-6-isopropyl-4,5-dimethyl-, 7-fluoro-4-methyl-, 7-iodo-4-methyl, 4,6,8-trimethyl-, 7-ethyl-4-methyl-, 7-proply-4-methyl-, 8-isopropyl-4-methyl, 6-isopropyl-4,7,8-trimethyl-, 7-butyl-4-methyl-, 8-sec-butyl-4-methyl-, 6,7,8-trimethoxy-4-methyl-, 7-ethoxy-4-methyl-, 7,8-diethoxy-4-methyl-, 7-propoxy-4-methyl-, 7-butoxy-4-methyl-1,2,3-benzoxathiazine 2,2-dioxide; 8-bromo-6-fluoro-4-ethyl-1,2,3-benzoxathiazine 2,2-dioxide, 6-chloro-7-methyl-4-ethyl-, 4,6-diethyl-, 8-isopropyl-5-methyl-4-ethyl-, 5-isopropyl-8-methyl-4-ethyl-, 6,8-dipropyl-4-ethyl-, 6-tert-butyl-4-ethyl-, 5-methyl-8-tert-butyl-4-ethyl-, 5,6,7-trimethoxy-4-ethyl-, 6-ethoxy-4-ethyl-1,2,3-benzoxathiazine 2,2-dioxide; 8-bromo-6-tert-butyl-4-propyl-1,2,3-benzoxathiazine 2,2-dioxide, 6-chloro-5,7-dimethyl - 4 - propyl-, 8-isopropyl-5-methyl-4-propyl-, 7-methoxy-4-propyl-1,2,3-benzoxathiazine 2,2 - dioxide; 8-methyl-4-isopropyl-1,2,3-benzoxathiazine 2,2-dioxide; 6,8-dichloro-4-butyl-1,2,3-benzoxathiazine 2,2 - dioxide, 6-fluoro-4-butyl-, 7-methyl-4-butyl-, 7-propyl-4-butyl-, 8-isopropyl-5-methyl-4-butyl-, 6-methoxy-4-butyl-1,2,3-benzoxathiazine 2,2-dioxide; 5,7-dimethoxy-4-isobutyl-1,2,3-benzoxathiazine 2,2-dioxide; and 7-methyl-4-isobutyl-1,2,3-benzoxathiazine 2,2-dioxide, respectively.

I claim:
1. 4-substituted-1,2,3-benzoxathiazine 2,2 - dioxide of the formula:

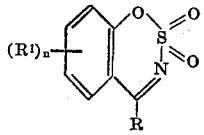

wherein R is a member selected from the group consisting of lower-alkyl, phenyl, lower-alkylphenyl, lower-alkoxyphenyl, and halophenyl; $R^1$ is a member selected from the group consisting of halogen, lower-alkyl, and lower-alkoxy; and $n$ is a whole number from 0 to 2, inclusive.

2. 4-lower-alkyl-1,2,3,-benzoxathiazine 2,2-dioxide.
3. 4-methyl-1,2,3-benzoxathiazine 2,2-dioxide.
4. 4,6-di-lower-alkyl-1,2,3,-benzoxathiazine 2,2-dioxide.
5. 4,6-dimethyl-1,2,3-benzoxathiazine 2,2-dioxide.
6. 4-phenyl-1,2,3-benzoxathiazine 2,2-dioxide.
7. 6-halo-4-phenyl-1,2,3-benzoxathiazine 2,2-dioxide.
8. 6-chloro-4-phenyl-1,2,3-benzoxathiazine 2,2-dioxide.
9. 7-lower-alkoxy-4-phenyl-1,2,3 - benzoxathiazine 2,2-dioxide.
10. 7-methoxy-4-phenyl-1,2,3-benzoxathiazine 2,2 - dioxide.
11. The process for preparing 4-substituted-1,2,3-benzoxathiazine 2,2-dioxide of the formula:

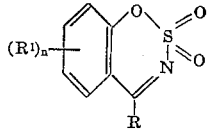

wherein R is a member selected from the group consisting of lower-alkyl, phenyl, lower-alkylphenyl, lower-alkoxyphenyl, and halophenyl; $R^1$ is a member selected from the group consisting of halogen, lower-alkyl, and lower-alkoxy; and $n$ is a whole number from 0 to 2, inclusive; which comprises condensing sulfamide with a compound of the formula:

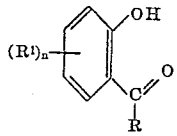

wherein R, $R^1$, and $n$ are as defined above.

12. The process according to claim 11 wherein the sulfamide and the hydroxy ketone are melted together at a temperature between about 120° and about 180° C.

No references cited.

WALTER A. MODANCE, *Primary Examiner.*
J. M. FORD, *Assistant Examiner.*